United States Patent [19]

Cornelison

[11] Patent Number: 4,725,411
[45] Date of Patent: Feb. 16, 1988

[54] DEVICE FOR PHYSICAL AND/OR CHEMICAL TREATMENT OF FLUIDS

[75] Inventor: Richard C. Cornelison, Hiram, Ohio

[73] Assignee: W. R. Grace & Co., New York, N.Y.

[21] Appl. No.: 796,710

[22] Filed: Nov. 12, 1985

[51] Int. Cl.⁴ .......................... B01J 8/02; B01J 35/04; F01N 3/28
[52] U.S. Cl. ..................... 422/180; 55/521; 55/527; 422/310; 422/182; 502/527
[58] Field of Search ............... 422/171, 177, 179, 180, 422/182, 310; 60/276, 299, 311; 502/527; 55/521, 525

[56] References Cited

U.S. PATENT DOCUMENTS

| | | | |
|---|---|---|---|
| 3,362,783 | 1/1968 | Leak | 422/180 |
| 3,561,928 | 2/1971 | Weber | 422/171 |
| 3,716,344 | 2/1973 | Ashburn | 422/180 |
| 3,841,840 | 10/1974 | Hundhausen et al. | 422/180 |
| 3,961,924 | 6/1976 | Alskog | 55/521 |
| 4,299,600 | 11/1981 | Kobashi | 422/182 |
| 4,346,557 | 8/1982 | Shadman et al. | 60/311 |
| 4,455,823 | 6/1984 | Bly et al. | 55/521 |

FOREIGN PATENT DOCUMENTS 3341868  5/1985  Fed. Rep. of Germany ...... 422/180

*Primary Examiner*—Michael S. Marcus
*Attorney, Agent, or Firm*—R. A. Sturges

[57] ABSTRACT

A fluid treating device for carrying out chemical and/or physical reactions in a flowing fluid stream in contact with a stationary corrugated thin metal member. The converter comprises a housing and fluid inlet and outlet means associated therewith to define an enclosed housing. The metallic element is an accordion folded thin ribbon having perforations through which fluid may pass through the metal strip for ingress or egress and contact with zig-zag corrugations. Catalysts may be supported on the corrugated metal element whereby the device is especially useful in treating exhaust gases. The device with or without catalyst is useful as a particulate trap, especially for diesel engines.

12 Claims, 6 Drawing Figures

DEVICE FOR PHYSICAL AND/OR CHEMICAL TREATMENT OF FLUIDS

This invention relates to a device for physical and/or chemical treatment of gases or liquids and more particulary to structures for carrying out chemical conversions in flowing fluids, either gas or liquid, in the presence of a supported stationary catalyst carried on a thin corrugated metal foil.

In more specific embodiments, the invention relates to a catalytic converter or trap structure for internal combustion engine exhaust gases, especially those characterized by the presence therein of entrained carbonaceous particles or droplets, e.g., carbon particles or unburned hydrocarbons, as well as other pollutants such as carbon monoxide, nitrogen oxides, etc. The structures hereof may also be used to carry out other catalyzed chemical reactions.

Although the devices hereof are especially adapted for use with catalysts of various kinds deposited on the surfaces coming in contract with the gases passing through, it should be understood that these devices may be used as particulate traps primarily useful with diesel engines. In some cases no catalyst is present in the devices.

BACKGROUND OF THE INVENTION AND PRIOR ART

For convenience, the invention will be described with particular reference to catalytic converters and particulate traps for diesel engines.

Internal combustion engines, whether spark or compression ignited, and due to incomplete combustion of the hydrocarbon fuel, often emit particulate material in the exhaust gases which is, for the most part finely divided carbon which may contain absorbed unburned hydrocarbons, sulfuric acid, nitrogen oxides, and other undesirable combustion by-products. Over the past several years, effort has been made to abate or materially reduce the highly visible "black" exhaust of diesel powered trucks, semis, off-the-road vehicles, and passenger cars. Although numerous devices utilizing honeycomb catalyst support members both ceramic and metallic have been suggested, (See for example "Diesel Particulate Control" P-158, SAE, The Engineering Resource for Advancing Mobility, International Congress and Exposition, Detroit, Mich., Feb. 25 1985—Mar. 1 1985 (ISBN 0-89883-719-7)) none is particularly effective where the exhaust is laden with particulate carbon. For examples of such devices, reference may be had to the patents to Retallick U.S. Pat. Nos. 4,402,871 dated Sept. 6 1983, 4,301,039 dated Nov. 17 1981, the patent to Chapmen et al. 4,318,888 dated Mar. 9 1982, and German Offenlegungsschrift No. 2,815,317, dated Oct. 18 1979. Suitable catalysts, e.g., platinum, palladium, and/or rhodium are on the surface of the honeycomb whether ceramic or metallic where it is firmly held and where the exhaust gases come into contact with the catalyst on the support surface. Under the combined effects of catalyst, oxygen, temperature, etc., the noxious oxides are converted to harmless gases and unburned hydrocarbons ignited and destroyed. This technology is at hand. See, for example the patent to Chapman U.S. Pat. No. 4,318,888, supra. Reference may also be had to U.S. Pat. Nos. 3,966,646 dated June 29 1976, 3,867,313 dated Feb. 18 1975, 3,873,472 dated Mar. 25 1975 to Oshima et al; U.S. Pat. No. 4,188,309 dated Feb. 12 1980 to Volker et al, all of which are directed to various catalyst systems and elements.

The foregoing typically have continuous tubular cells. In some cases, the cells may be blocked at one end for the purpose of forcing the gas containing the finely divided particulates to pass through the side wall of the ceramic cell to enter an adjacent cell which is open to permit exit of the filtered gas to the atmosphere. These devices of the "honeycomb" type devices are not particularly suitable for use with diesel engines. As indicated above, considerable effort has been expended in making all metal devices for control of exhaust emissions from diesel engines. However, the flow of exhaust gas through the metallic catalyst support media of the prior art has usually been along one catalyst coated side or between spaced catalyst coated sides from entrance to exit, also along continuous tubular pathways into and out of the catalytic unit. The gas flow has been parallel to the corrugations or the elongated tubular catalyst cells. Carbon suspended in the exhaust is virtually unaffected by the catalyst, although some carbon may burn along with unburned hydrocarbon in the exhaust in the presence of air which may be introduced for the purpose. The gas velocity and exhaust temperature is such that most of the particulate carbon escapes any conversion and is vented to the air as an offensive black smoke especially when the engine is under heavy load, e.g., at start up from rest.

The patents to Retallick U.S. Pat. Nos. 4,301,039 dated Nov. 17 1981 and 4,402,871 dated Sept. 6 1983 disclose forms of metallic catalyst support unit characterized by a series of discontinuous displacements of metal out of the plane of a metal strip in each direction relative to the surface, i.e., elevated and depressed. These displacements are elongated and have an axial dimension longer than the depth of the displacement out of the plane of the metal strip. The elongated displacements lie with their axes normal to the marginal edges of the strip. There is a plurality of such displacements across the width of the strip. Such discontinuous displacements may have their axes along a line perpendicular to the marginal edges, or adjacent displacements may be longitudinally spaced relative to the longitudinal axis of the metal strip. This arrangement is disclosed in U.S. patent application No. 648,381 filed Sept. 7 1984 by W. B. Retallick. Whatever the geometry of these bumps and depressions, the objective has been to flow a particulate-containing gas between confronting and contacting surfaces of a flat plate and a plate having bumps and/or depressions in a direction normal to the longitudinal extent of the bump or depression. The purpose of this configuration and gas flow pattern is to cause the gas to flow along a tortuous path and undergo abrupt changes in direction resulting in the entrained particles being thrown out of the gas stream whereby the particles collect in "clefts" formed by the "bumps" and a contiguous plate or member. Such action causes a build-up of carbon particles which if too long continued will plug the catalytic converter. Consequently, means are provided which for convenience may be responsive to back pressure in the system for shifting the exhaust to a parallel regenerated catalytic converter free of accumulated carbon or into a by-pass line. A system including a pressure responsive plate valve may be used for this purpose.

There are several known ways of regenerating the trap or catalytic converter trap. These generally involve combusting the carbon and any absorbed hydrocarbon or other pollutant to form carbon dioxide and water plus minor amounts of other oxides. To accomplish this, additional air and fuel may be introduced into the trap or converter, and if the temperature is sufficient, the carbon will ignite spontaneously. The presence of oxidation catalysts in the converter/trap will also aid in regeneration. One or more glow plugs may be inserted in the trap housing, or a "Calrod" unit superimposed over the face of the particle trap structure. Still further, combustion aiding additives may be included in the fuel to promote burning off of the accumulated carbon. Where oxidation catalysts, e.g., palladium, and/or platinum, and/or rhodium are present within the catalytic converter/trap the temperatures encountered in regeneration are generally insufficient to adversely affect the catalyst system or the catalyst support.

The present invention provides a much less costly system readily adaptable to mass production for trapping particulates within a catalyst support member. Contrary to prior devices, the improved structures function in a manner different from prior devices in that the gas flows through the catalyst support from one side to the obverse side of the foil for at least a portion of its traverse through the system. Better entrapment of particulates, i.e., a better loading is secured before the pressure drop through the system becomes too great. At the same time, the normal catalytic conversion of internal engine combustion pollutants may be achieved.

BRIEF STATEMENT OF THE INVENTION

Briefly stated, the present invention is in a fluid treating device comprising (a) a housing, (b) a fluid inlet manifold, (c) a fluid outlet manifold, and (d) a metallic element within said housing. The metallic element, which may support one or more precious metal catalysts, comprises a metal foil or strip that is corrugated so that the surface consists of a series of peaks and valleys extending laterally between the side marginal edges of the strip and displaced out of the plane of the strip. The corrugations are preferably of zig-zag, wavy or sinuous configuration. The corrugations are continuous from side to side of the metallic strip. At intervals along the strip, preferably at uniformly longitudinally spaced intervals, there are provided perforations extending transverely across the strip. The strip is folded back and forth upon itself in a fan fold or accordion fold along these perforations. The geometry of the peaks and valleys is such that the respective contiguous folds do not nest together and contiguous and confronting peaks cross each other at a point thereby imposing minimal resistance to the flow of fluid. The perforations, then, allow gas containing particulates to enter between contiguous layers by passing through the holes or perforations in metal strip and thence into contact with the transversely extending corrugations, or alternatively, to enter between contiguous layers and exit through the holes or perforations in the metal strip at the opposite folded end of the catalyst supporting element. The gas containing particulates passes through the catalytic element in a direction generally normal to the peaks and valleys thereby undergoing rapid changes in direction and velocity whereby the suspended particles are dropped out and accumulate on the roughened and contoured catalyst surface. The particle containing gas or fluid passes through the foil either at its entrance to or exit from the fan folded element unit or units. Along with the deposition of the solid particulates within the element, the environmentally undesirable gases may be converted to environmentally acceptable compounds or acceptable levels thereof.

BRIEF DESCRIPTION OF THE DRAWINGS

The invention may be better understood by having reference to the annexed drawings wherein.

DETAILED DESCRIPTION OF THE INVENTION

As indicated above, the present invention is primarily concerned with a catalytic converter for use with internal combustion engines, and particularly internal combustion engines of the compression ignition type. It is a principal object of the present invention to provide a relatively inexpensive catalytic converter, and one which is effective to remove particulates from engine exhaust. In the case of diesel engines in particular and under certain loading conditions, there is produced in the exhaust a substantial quantity of unburned carbon indicative of incomplete combustion. This appears as annoying black smoke issuing from the exhaust pipe or pipes. The present invention provides a structure which is especially adapted to reducing to an acceptable level the amount of particulate material, especially finely divided carbon particles issuing, from the exhaust of an internal combustion engine.

As indicated above, the structures hereof need not include an oxidation catalyst and may nevertheless be operated as an effective particulate trap. The devices hereof for illustrative purposes will be described with one or more catalysts contained therein as a preferred embodiment of the invention.

Figure 1:
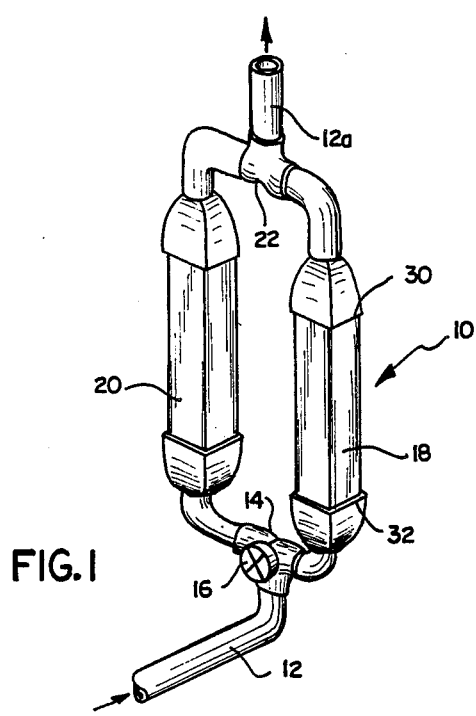
FIG. 1 is a perspective view of a diesel exhaust system containing a pair of catalytic converters or particulate traps of the present invention arranged in parallel, whereby one converter or trap can undergo regeneration while the other is in normal use.

FIG. 1 shows in perspective, a system 10 for achieving the foregoing objectives and consisting of a pair of catalytic converters 18 and 20 disposed in parallel and inserted in the exhaust, for example, the tail pipe 12, 12a. The tail pipe 12 enters a "Y" fitting 14 which includes a flapper valve 16 for selectively directing exhaust gases to either of the catalytic converters 18 and 20. The catalytic converters 18 and 20 not only catalyze the conversion of noxious gases, such as carbon monoxide, nitrogen oxides, unburned hydrocarbons, etc., to harmless environmentally acceptable gaseous materials, but also trap carbonaceous particulates and physically restrain them from escaping through the tail pipe 12a. These converters are used alternatively. Thus, when one of the converters, for example, converter 18, becomes clogged with carbon (as evidenced by a pressure drop through the converter exceeding a predetermined level) the butterfly valve 16 is automatically repositioned to permit the exhaust eminating through tail pipe portion 12 to enter the regenerated catalytic converter 20 while conditions are created within the catalytic converter 18 to effect burning off of the accumulated carbon deposits and regeneration of the converter 18. Details of a suitable system for automatically monitoring and adjusting the flapper valve 16 are provided in U.S. patent application Ser. No. 648,381 filed Sept. 7 1984 by William B. Retallick, and commonly owned with the present application.

Figure 4:
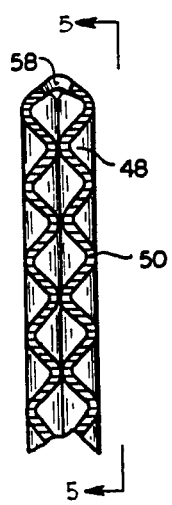
FIG. 4 is a fragmentary cross-section on an enlarged scale showing the nonnesting relation of contiguous layers of the corrugated foil as it appears in the plane indicated by the line 4—4 in FIG. 3.
Figure 6:
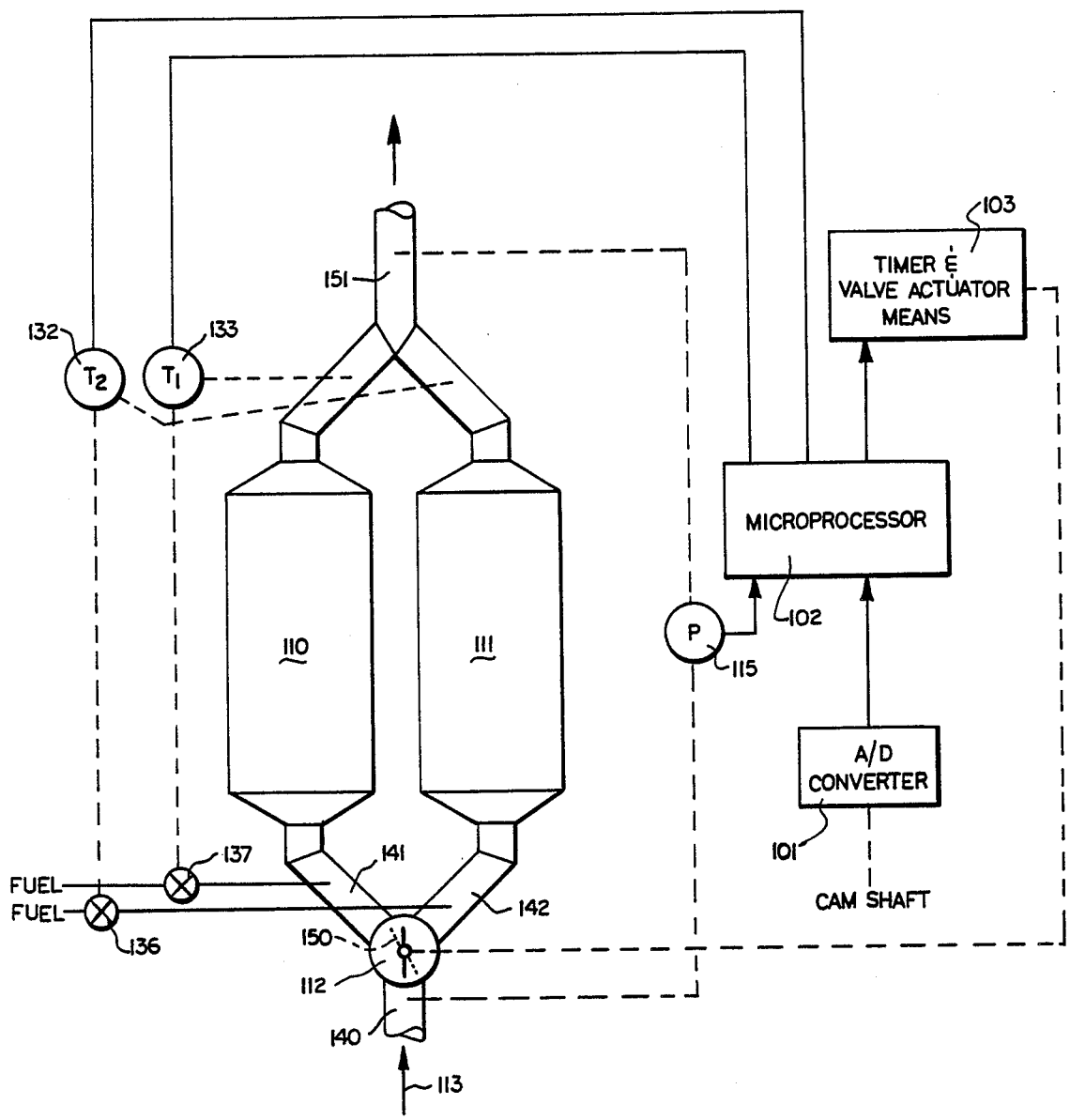
FIG. 6 is a schematic and diagrammatic illustration of a regeneration system useful with the devices of the present invention.

FIG. 6 corresponds to FIG. 4 of the aforesaid U.S. Ser. No. 648,381, and follows the same numbering sequence used therein.

The regeneration operation is effected by the injection of fuel, e.g., diesel fuel, into the catalytic converter, for example, converter 18, along with sufficient air to enable combustion to occur and physically burn the trapped carbon particles thereby converting the fuel and carbon to carbon dioxide and water. These effluent gases are combined along with the catalytically converted gases from the opposite converter 20 through a "Y" fitting 22 for exit through the tail pipe portion 12a.

Figure 2:
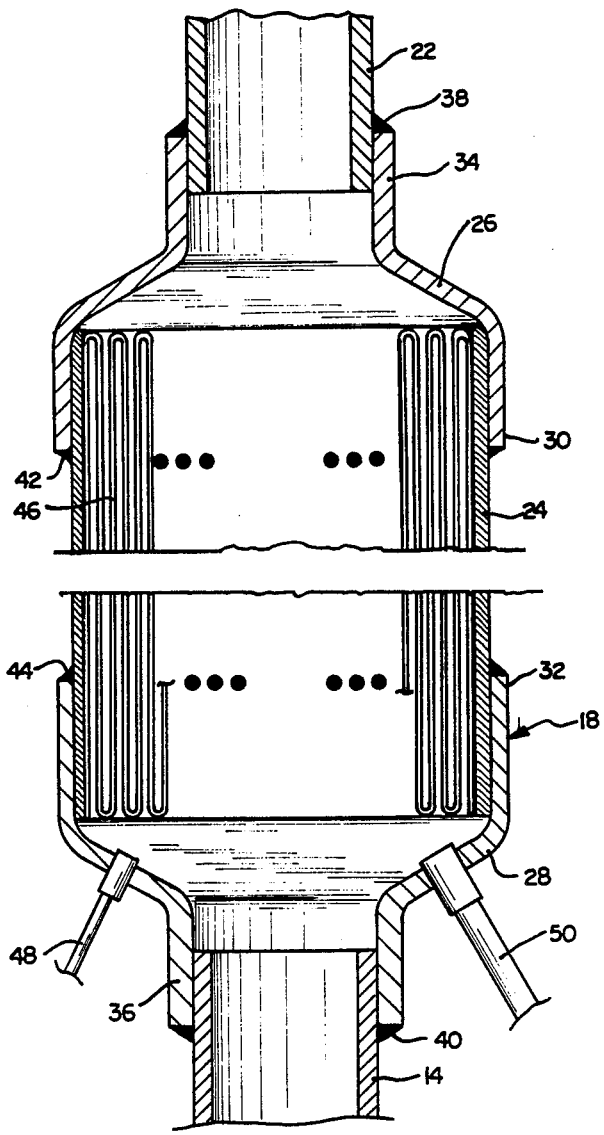
FIG. 2 is a fragmentary partially cut-away cross-sectional view of a device of the present invention showing a fan-folded element within a housing and end caps or manifolds at each end.

Referring now more particularly to FIG. 2, there is here shown in fragmentary cross section a catalytic converter 18 having a rectangular tubular housing 24 fitted at each end with a suitable end cap 26 and 28, respectively. The end caps 26 and 28 are geometrically configured to accept at their respective larger or widemouth extremities 30 and 32 the tubular housing 24 of rectangular or square cross section. The end caps 26 and 28 converge desirably to a circular nipple portion 34 and 36, respectively, dimensioned to accept a leg of the respective "Y" members 14 and 22. Attachment is conveniently by welding such as weldments 38 and 40. Attachment to the housing 24 is also conveniently by means of weldments such as weldments 42 and 44.

The housing 24 is adapted to contain a metallic catalyst support member 46. The metallic substrate is a ferrous metal, preferably stainless steel.

Also shown in FIG. 2 is a fuel inlet 48 through which a readily vaporizable fuel, e.g., diesel fuel, may be introduced during the regeneration phase of operation. Also there is provided an inlet port 50 for the introduction of air into the system in an amount sufficient to promote combustion of the fuel and the carbon trapped within the metallic catalyst support member 46 useful in accordance with the present invention. A glow-plug (not shown) may be used in the end cap 26 to aid ignition of the fuel.

The catalyst support member 46 is formed from a thin preferably stainless steel ribbon. This ribbon is generally from about 3 to about 12 inches in width and has a thickness of from 0.0015/0.003 inch and a yield strength of approximately 75,000 psi. The steel is provided with an aluminum coating, preferably by dipping, and the aluminum coated steel strip subjected to a calorizing process whereby at least a surface portion of the aluminum and the underlying iron become alloyed together much as described in the patent to Downs U.S. Pat. No. 1,636,685. The strip is desirably annealed to overcome the brittleness of the calorizing process. The metal strip of the converter 20 is corrugated by passing the strip between toothed rollers adapted to depress portions of the metal out of the plain of the metal sheet to provide curved ribs or indentations uniformly along the length of the strip. The corrugations in the devices of the present invention are preferably laterally directed from side to side of the strip between the marginal edges thereof and do not form a straight line. Because of the configuration of the surfaces of the gears whereby the rolling teeth are canted on the outer surface thereof, and a series of alternating oppositely canted gears are mounted on a common shaft, there results a corrugation which is zig-zag in configuration to provide a herringbone pattern across the surface of the metal strip. Instead of straight line segments such as shown in FIG. 3, the segments may be sinusoidal by using differently configured gear teeth.

Figure 3:
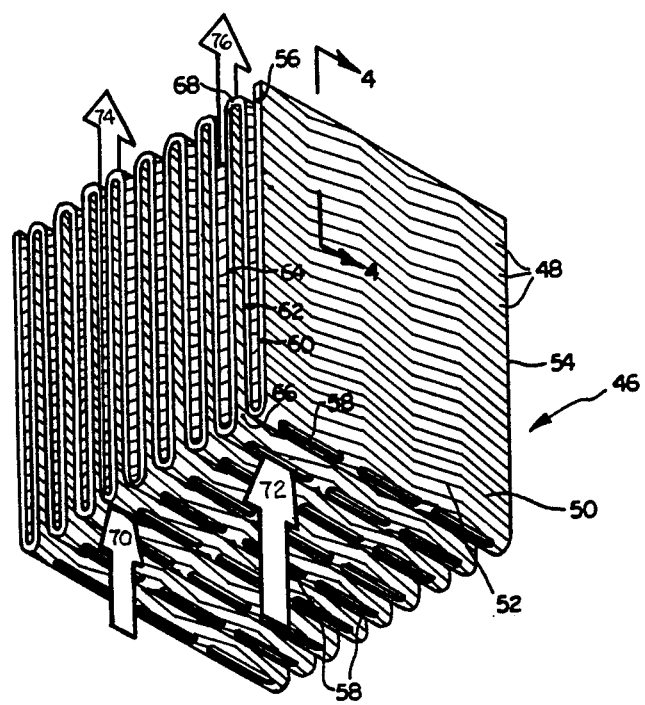
FIG. 3 is an isometric view of a fan-folded or accordion folded element in accordance with the present invention showing the transversely extending wavy corrugations and the perforations for gas passage through the foil of the element and the gas entry and exit paths.

Referring to FIG. 3, the corrugations 48 are shown. Each corrugation is composed of a depression 48 and a peak such as the peak 50 and the peak 52. It will be noted that the peaks and valleys are in a zig-zag configuration between the parallel marginal edges 54 and 56.

As indicated above, the entire unit is fan folded, i.e., a continuous strip is folded back and forth upon itself at uniformly spaced intervals. The intervals are determined by a series of transverse perforations extending through the metal strip and provide means for ingress and egress of gases between confronting layers. For example, the layers 60 and 62 are in confronting relation, and gas may enter beteen layer 60 and 62 through the perforations 58. In like manner, the gas may enter between confronting layers 62 and 64 by passing through the opening 66. A similar set of perforations 58 is provided along the fold line 68 to permit passage of gases fom between layers 62 and 64. The gas flow pattern is best shown in FIG. 3. Gas moving along the path indicated by the arrow 70 enters the catalyst element 46 between the confronting layers 62 and 64. Gas having entered along arrow 70 exits the element 46 through a perforation 58 indicated by the arrow 74. Gas moving along the path indicated by the arrow 72 enters the catalytic element 46 through the perforations 58 and moves through the element 46 between confronting corrugated surfaces 60 and 62, and exits along the path indicated by the arrow 76.

Figure 5:
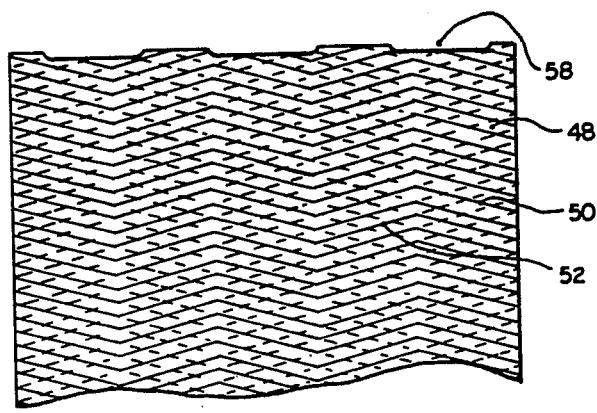
FIG. 5 is a fragmentary plan elevation of the folded corrugated segment shown in FIG. 4 as it appears in the plane indicated by the line 5—5 in FIG. 4.

The zig-zag rolled configuration, best shown in FIG. 4 is believed to cause sufficient changes in the velocity and direction of the gas as it passes through between the folds, for example, between confronting faces 60 and 62, and confronting faces 62 and 64, to cause particulates carried in the gas stream to become adhered to the roughened catalytic surface and thus abstracted from the exhaust stream. The gases do not traverse the spaces by making sharp right angular turns and depositing carbon in "clefts" between adjacent or confronting layers of metal. As best shown in FIG. 5, the contact points between the confronting faces are relatively minor and thus, the structure of the present invention does not rely especially on the presence of "clefts" for the trapping of carbon particles.

According to FIG. 6, only one converter at a time is regenerated. The temperature of regeneration is about 600° C. Catalytic converters 110 and 111 are of substantially the same contruction as that shown in FIGS. 1-5. The direction of exhaust gas flow is indicated by the arrows 113 and 114. Exhaust duct 140 is connected to a butterfly valve 112 which is connected to conduits 141 and 142 which conduct gas into the converters 110 and 111.

The butterfly valve 112 has three positions: a neutral position as shown, allowing gas to flow freely into both converters, and two positions which force most of the gas to flow to only one of the converters 110 and 111. The dotted line 150 represents one of the latter positions in which most of the flow to converter 110 is cut off. The remaining valve position (not shown) closes off most of the flow to converter 111. The butterfly valve 112 thus comprises a diverter means which diverts the flow to one or the other of the catalytic converters 110 and 111.

The flow of exhaust gas to either converter 110 or 111 should not be closed off entirely. Diesel engine exhaust contains considerable amounts of oxygen which is useful to support combustion during the regeneration process. Of course, supplemental oxygen and/or fuel may be added as required.

A pressure monitor 115 is connected to the input and output ends of the apparatus. Note that the pressure drop is measured at exhaust duct 140 and output duct 151, i.e., the pressure drop is measured across the entire system.

A microprocessor 102 receives input representing the pressure drop as well as the engine speed form analog to digital converter 101. Microprocessor 102 stores data representing the change of pressure drop with engine speed.

Microprocessor 102 is connected to temperature sensors 132 and 133 which control fuel valves 136 and 137, respectively. Microprocessor 102 is also connected to a timer and valve actuator means 103 which operates the butterfly valve 112.

When the microprocessor 102 senses an unacceptably high pressure drop, it causes the valve actuator means 103 to turn the butterfly valve 112 to one of its two non-neutral positions and then to the other such position. For example, the valve actuator means 103 will first actuate valve 112 such that flow of gas through converter 110 is substantially cut off. Valve 112 is held in this position for a few seconds by the actuator means 103 while the microprocessor 102 internally records and stores the sensed pressure drop. This pressure drop gives an indication of the extent to which converter 111 is filled with trapped particulates.

Valve actuator means 103 when causes valve 112 to cut off most of the exhaust gas flow to converter 111 and microprocessor 102 then records and stores the pressure drop reading. The microprocessor 102 then selects the catalytic converter, either 110 or 111, that is in the greater need of regeneration.

When the microprocessor 102 selects a converter for regeneration, it emits an enabling signal to one of the temperature controllers 132 or 133 to cause fuel to be injected in a controlled manner into the converter selected for regeneration.

While one of the converters 110 or 111 is undergoing regeneration, microprocessor 102 keeps a record of the elapsed time. After 5 minutes of regeneration, for example, the microprocessor 102 momentarily disables the temperature controller 132 or 133, as the case may be, and through the valve actuator means 103 turns the butterfly valve 112 momentarily to a neutral position. The pressure drop across the entire system is again measured. If the pressure drop is sufficiently low for the current engine speed, the regeneration is complete and the system returns to its original state, i.e., with the butterfly valve 112 in a neutral position and both temperature controllers 132 and 133 disabled. If the pressure drop is not low enough, the microprocessor 102 reactivates the temperature controller that was previously operative and regeneration continues. Thereafter, every minute the microprocessor 102 interrupts the regeneration process to determine whether regeneration may be terminated.

The test for completeness of the regeneration process requires 1 to 2 seconds. The entire regeneration process may take from 5 to 10 minutes, or more. It is expected that for most of the period during which the engine is running, no regeneration is taking place and the butterfly valve 112 would therefore be in a neutral position most of the time.

In the preferred embodiments of the present invention, the length of the catalytic converter unit 18, 20 may range from 10 to 16 inches, and is preferably 12-14 inches in length. For most purposes, a single fan folded unit 46 may be used in each of the housings. Alternatively, a plurality of fan folded units 46 of shorter length than the axial length of housing 24 may be employed. However, this merely increases the cost without particular advantage in efficiency of operation.

In preparing the catalytic surface, the metal may be calorized as indicated above and then coated with a "wash coat" of aluminum oxide uniformly applied to the corrugated surface and carefully dried. This provides a strongly adherent base onto which catalytic metals such as palladium, platinum, rhodium, nickel, copper, or combinations of such catalysts may be applied by known means. For exhaust treatment purposes, the usual catalysts are platinum, and/or palladium, and/or rhodium. Numerous catalytic systems are available for use in accordance with the present invention. Reference may be had to the patent to Oshima et al U.S. Pat. No. 3,873,472 for an all metal catalyst element for purifying exhaust gases. The patent to Brewer U.S. Pat. No. 3,867,313 also discloses another all metal high temperature resistant catalyst element provided by plating or depositing a noble metal comprising platinum and/or palladium onto a base material which comprises primarily aluminum, chromium and iron.

In order to provide control of the exhaust such that the proper catalytic converter is cut off when the back pressure arrives at a certain level indicating sufficient accumulation of particulate carbon to require regeneration, reference may be had to the Patent to Hicks U.S. Pat. No. 4,462,208 and the patent to Oishi et al U.S. Pat. No. 4,404,795, both of which are incorporated herein by reference.

What is claimed is:

1. A fluid treating device comprising (a) a housing, (b) a fluid inlet manifold attached to one end of said housing, (c) a fluid outlet manifold attached to the other end of said housing, said inlet manifold, said outlet manifold and said housing lying along a common axis and (d) a metallic element located within said housing and having a catalyst supported thereon and formed from a thin elongated metal strip having parallel longitudinal marginal edges, said element being accordion folded along fold lines perpendicular to said parallel longitudinal marginal edges to form a fold between adjacent fold lines, each fold being characterized by a corrugated surface, the corrugations being composed of alternating peaks and valleys displaced out of the surface of said metal strip and extending between said parallel longitudinal marginal edges, said metal strip having perforations along the accordion fold lines for the passage of a fluid medium through the strip and into contact with the surface of an entire length of an accordion fold before exiting said element (d), the fold lines being located in said housing perpendicularly to said common axis, whereby when fluid flows through the device, the direction of flow is the same as the direction of said common axis.

2. A fluid treating device as defined in claim 1 which is further characterized by (e) means for selectively injecting into said device an agent reactive with at least a portion of said fluid medium under the influence of said catalyst.

3. A fluid treating device as defined in claim 1 wherein the corrugations have a zig-zag configuration to provide a herringbone pattern on the surface of the metal strip.

4. A fluid treating device as defined in claim 1 wherein the corrugations have a sinuous configuration to provide a wavy pattern on the metal surface.

5. A fluid treating device as defined in claim 1 wherein the metal strip is stainless steel.

6. A fluid treating device as defined in claim 5 wherein the metal strip is aluminized iron.

7. A fluid treating device as defined in claim 1 wherein the surface of said metal strip is provided with a thin layer of aluminum oxide strongly adhered thereto which forms a base for adhering said catalyst to said metallic strip.

8. A fluid treating device as defined in claim 7 wherein the catalyst adhered to said aluminum oxide layer comprises a noble metal catalyst.

9. A fluid treating device as defined in claim 8 wherein the noble metal is platinum.

10. A fluid treating device as defined in claim 8 wherein the noble metal is palladium.

11. A fluid treating device as defined in claim 9 additionally characterized by the presence of rhodium.

12. A fluid treating device as defined in claim 11 additionally characterized by the presence of rhodium.

* * * * *